(12) United States Patent
Guirard et al.

(10) Patent No.: US 12,324,423 B2
(45) Date of Patent: Jun. 10, 2025

(54) LIVE CRUSTACEAN HOLDING FISHING DEVICE

(71) Applicants: Rick Guirard, North Palm Beach, FL (US); Mark Khan, Lake Worth, FL (US)

(72) Inventors: Rick Guirard, North Palm Beach, FL (US); Mark Khan, Lake Worth, FL (US)

( * ) Notice: Subject to any disclaimer, the term of this patent is extended or adjusted under 35 U.S.C. 154(b) by 0 days.

(21) Appl. No.: 18/402,428

(22) Filed: Jan. 2, 2024

(65) Prior Publication Data

US 2024/0130343 A1 Apr. 25, 2024

Related U.S. Application Data

(63) Continuation-in-part of application No. 17/723,188, filed on Apr. 18, 2022, now abandoned.

(Continued)

(51) Int. Cl.
*A01K 83/06* (2006.01)

(52) U.S. Cl.
CPC .................................. *A01K 83/064* (2022.02)

(58) Field of Classification Search
CPC .... A01K 83/064; A01K 83/06; A01K 83/061; A01K 85/18; A01K 85/00; A01K 85/005; A01K 85/01; A01K 85/02; A01K 85/08; A01K 85/10; A01K 85/12; A01K 85/14; A01K 85/16; A01K 85/011; A01K 85/012; A01K 85/013; A01K 85/019; A01K 85/026; A01K 85/027; A01K 85/028; A01K 85/029; A01K 85/1803; A01K 85/1807; A01K 85/1811; A01K 85/1813; A01K 85/1817; A01K 85/1821; A01K 85/1823; A01K 85/1827; A01K 85/1831; A01K 85/1833; A01K 85/1837; A01K 85/1841; A01K 85/1843; A01K 85/1847; A01K 85/1851; A01K 85/1853; A01K 85/1857; A01K 85/1861; A01K 85/1863;

(Continued)

(56) References Cited

U.S. PATENT DOCUMENTS 2,605,579 A * 8/1952 Chadwick .............. A01K 83/06
43/44.4
3,359,674 A * 12/1967 Strumor ................. A01K 85/18
43/42.22

(Continued)

*Primary Examiner* — Morgan T Jordan
*Assistant Examiner* — Shada Mohamed Alghailani
(74) *Attorney, Agent, or Firm* — RosserIP, LLC; Roy Rosser

(57) ABSTRACT

A live-crustacean holding fishing device and methods of making it are disclosed. The device includes a clasp attached to a long shank fishing hook. The clasp has a shell grasping portion at one end and is attached to tubular stretchable hook-casing at the other. The hook-casing has an attached ring tab. A live crustation is attached by fitting the shell grasping portion of the clasp between the carapace and first segment of the abdomen, then stretching the hook-casing so that the ring tab fits over the shrimp's horn. This secures the live crustation to the hook, but allows it to live and swim freely thereby serving as a live lure. The clasp is either glued to, or molded around, the shank of the hook. The hook-casing is secured to the clasp either by an adhesive or by lateral openings that fit over lateral protrusions on the clasp.

15 Claims, 2 Drawing Sheets

Related U.S. Application Data

(60) Provisional application No. 63/332,122, filed on Apr. 18, 2022, provisional application No. 63/176,288, filed on Apr. 18, 2021.

(58) Field of Classification Search
CPC ............ A01K 85/1867; A01K 85/1871; A01K 85/1873; A01K 85/1877; A01K 85/1881; A01K 85/1883; A01K 85/1887; A01K 85/1891; A01K 85/1893; A01K 85/1897; A01K 83/063
See application file for complete search history.

(56) References Cited

U.S. PATENT DOCUMENTS

| | | | | |
|---|---|---|---|---|
| 3,377,734 | A * | 4/1968 | Snow | A01K 85/16 43/42.38 |
| 3,645,031 | A * | 2/1972 | Egles | A01K 83/06 43/44.2 |
| 3,729,851 | A | 5/1973 | Garcia | |
| 4,248,003 | A * | 2/1981 | Thesz | A01K 83/06 43/44.8 |
| 7,107,719 | B1 * | 9/2006 | Scott | A01K 85/00 43/42.26 |
| 2004/0060224 | A1 * | 4/2004 | Churches | A01K 85/08 43/42.53 |
| 2014/0215895 | A1 * | 8/2014 | Zobrosky | A01K 83/06 43/44.8 |

\* cited by examiner

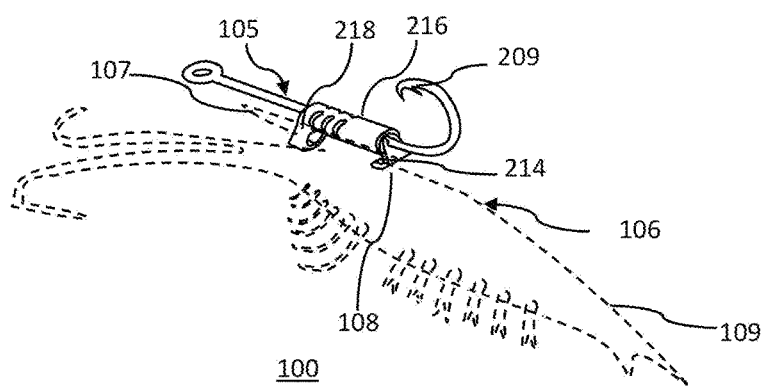
FIG. 1
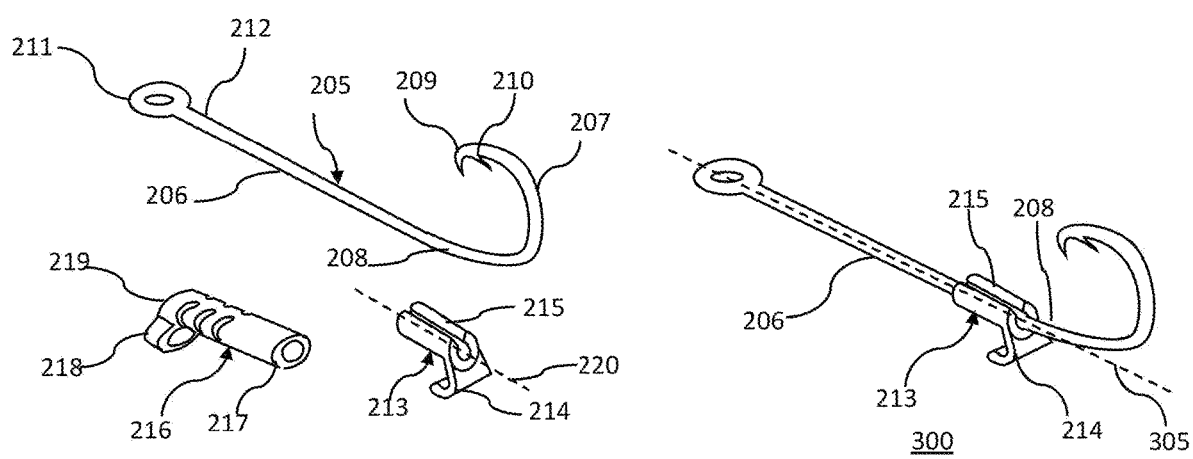
FIG. 2
FIG. 3
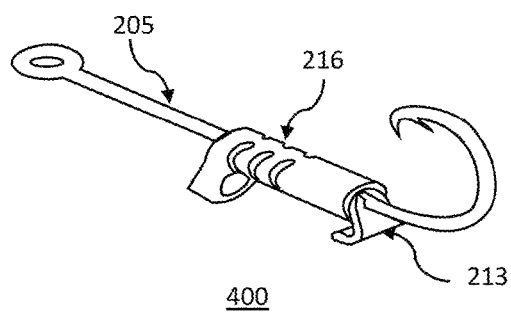
FIG. 4

LIVE CRUSTACEAN HOLDING FISHING DEVICE

CROSS-REFERENCE TO RELATED APPLICATIONS

This is a US continuation-in-part application of U.S. patent application Ser. No. 17/723,188 entitled "Live Crustacean Holding Fishing Device" that was filed on Apr. 18, 2022, that in turn claims priority to U.S. provisional application 63/176,288 entitled "Live shrimp securing fishing lure" filed on Apr. 18, 2021, and US provisional application 63/332/122 entitled "Live Crustacean Holding Fishing Device" filed on Apr. 18, 2022, the contents of all of which are hereby fully incorporated by reference.

BACKGROUND OF THE INVENTION

(1) Field of the Invention

The present invention relates to fishing tackle and more particularly to live-crustacean holding fishing devices intended primarily as fishing lures in which a live crustacean such as, but not limited to, a live shrimp, may be attached to a fishing hook such that the crustacean may still be free to swim in the water as a live lure or bait.

(2) Description of Related Art

A common method of securing a crustacean such as, but not limited to, a shrimp or a crayfish, to a hook as bait is to pierce the tail of the crustacean with a hook. The disadvantage of such a procedure is that the shrimp or crayfish tends to be short lived and frequently works free of the hook. Some special lure devices have been designed such that they encircle the body of the shrimp or minnow. Others encircle the body under tension or pierce the body of the shrimp. Others employ spring action to clamp the body of the shrimp or minnow to the hook. All of these tend to impede the swimming motion of the shrimp or minnow.

What is desired is a device that securely fastens the crustation to the hook while having a minimal impact on the other crustations well-being or ability to swim.

DESCRIPTION OF THE RELATED ART

The relevant prior art includes:

U.S. Pat. No. 3,729,851 issued to Garcia on May 1, 1973, entitled "LIVE SHRIMP SECURING FISHING LURE" that describes a combined fishhook live shrimp holding device primarily designed as a saltwater fishing lure. The device employs a long shank double or treble hook to which is secured adjacent the bight of the hook a shell grasping member. The device is further attached to the shrimp by means of a shrimp horn ring that is secured in position by either spring loading or friction or a combination of both.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive live-crustacean holding fishing device and methods of making it are disclosed.

In a preferred embodiment, the live-crustacean holding fishing device may include a long shank fishing hook having a clasp attached to a forward end of the hook's shank. The clasp may have a shell grasping portion at one end and may, in turn, be attached to a tubular stretchable hook-casing. The tubular stretchable hook-casing may be attached to the clasp at a first end, and may have a ring tab attached to a second end. The ring tab may be sized and shaped to accommodate a horn, or rostrum, of a crustation such as, but not limited to, a shrimp.

A live crustation such as, but not limited to, a shrimp, may be attached to the live-crustacean holding fishing device by fitting the shell grasping portion of the clasp between the carapace and the first segment of the abdomen, then stretching the ring tab of the tubular stretchable hook-casing to fit over the shrimp's rostrum, or horn. In this manner, the live crustation may be securely attached to the hook, but may still be able to swim freely, thereby serving as a live lure or bait. Moreover, the hook may be upward facing i.e., the point of the hook may face upward, away from the tail of the live crustacean when attached to the live crustacean. This arrangement may allow for better casting, better tracking of the shrimp and better hooking of the prey.

The clasp may have a groove that may be used to secure it to the shank of the hook. Alternately, the clasp may be molded around the hook's shank. The clasp may also be further secured to the hook by a suitable adhesive such as, but not limited to, an epoxy glue.

The tubular stretchable hook-casing may be secured to the clasp by means of a suitable adhesive. Alternatively, the clasp may have one or more lateral protrusions, and the tubular stretchable hook-casing may have corresponding lateral openings. The hook-casing may then be removably secured to the casing by fitting the lateral openings over the lateral protrusions.

The clasp may, for instance, be made of a suitable material such as, but not limited to, a moldable plastic such as, but not limited to, ABS plastic.

The tubular stretchable hook-casing may be made of a suitable material such as, but not limited to, an elastomer such as, but not limited to, silicone rubber.

It is an object of the present invention to provide a device that will securely hold a live crustacean to a fishing hook with minimum injury thereby allowing the crustacean to remain alive.

BRIEF DESCRIPTION OF THE SEVERAL VIEWS OF THE DRAWINGS

FIG. 1 shows a schematic diagram of a live shrimp attached to a live-crustacean holding fishing device of one embodiment of the present invention.

FIG. 2 is a schematic diagram showing representative component parts of one embodiment of a live-crustacean holding fishing device of the present invention.

FIG. 3 is a schematic diagram showing a first stage in assembling one embodiment of a live-crustacean holding fishing device of the present invention.

FIG. 4 is a schematic diagram showing an assembled live-crustacean holding fishing device of one embodiment of the present invention.

DETAILED DESCRIPTION OF THE INVENTION

Figure 5:
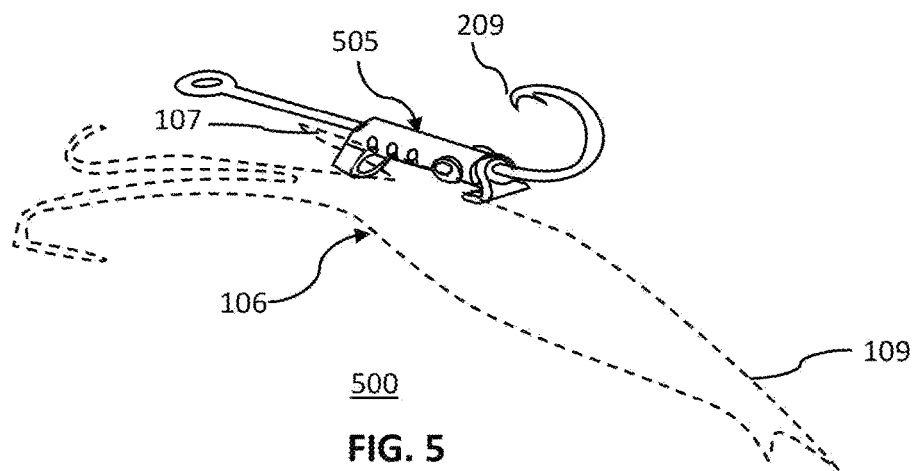
FIG. 5 is a schematic diagram showing a live shrimp attached to a live-crustacean holding fishing device of a further embodiment of the present invention.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic diagram 100 of a live shrimp 106 attached to a live-crustacean holding fishing device 105 of one embodiment of the present invention.

A shell grasping portion 214 of the live-crustacean holding fishing device may be inserted into a gap 108 between the carapace and the first segment of the abdomen of the shrimp. A ring tab 218 sized to accommodate a horn, or rostrum, of a shrimp may then be placed over the horn, or rostrum, 107 of the shrimp. This may be achieved by stretching the tubular stretchable hook-casing 216 to which the ring tab is attached. The shrimp may then be securely fastened in tension to the fishing hook with minimal injury to the shrimp. The shrimp may still be alive and able to swim freely and thereby act as a live lure or bait. Moreover, unlike prior art arrangements as, for instance, disclosed in U.S. Pat. No. 3,729,851 issued to Garcia on May 1, 1973, entitled "LIVE SHRIMP SECURING FISHING LURE, the hook may be upward facing i.e., point of the hook 209 may face upward, away from the tail 109 when attached to said live-crustacean. This arrangement may allow for better casting, better tracking of the shrimp and better hooking of the prey.

FIG. 2 is a schematic diagram 200 showing representative component parts of one embodiment of a live-crustacean holding fishing device of the present invention.

The components may include a fishing hook 205, a clasp 213 and a tubular stretchable hook-casing 216.

The fishing hook 205 may be a long shank hook having a shank 206. A forward end 208 of the shank may lead via an arcuate bight 207 to a point 209. Adjacent to the point may be one or more barbs 210. An aft end 212 of the shank may be attached to a line securing eye 211.

The clasp 213 may have a shell grasping portion 214 and a tubular groove 215. The shell grasping portion may protrude substantially normal to an axis 220 of the tubular groove. The clasp may, for instance, be constructed of a suitable material such as, but not limited to, a moldable, rigid thermoplastic such as, but not limited to, a terpolymer such as, but not limited to, acrylonitrile butadiene styrene (ABS).

The tubular stretchable hook-casing 216 may have a first end 217 and a second end 219. A ring tab 218 sized and shaped to accommodate a horn of a shrimp may be attached to, or form a part of, the second end of the stretchable hook-casing. The tubular stretchable hook-casing may, for instance, be made of an elastomer such as, but not limited to, silicone rubber.

FIG. 3 is a schematic diagram 300 showing a first stage in assembling one embodiment of a live-crustacean holding fishing device of the present invention. As shown in FIG. 3, the clasp 213 may be attached to the shank 206 of the hook by means of the tubular groove 215 in the clasp. When the clasp is attached to the hook, the shell grasping portion 214 may be located in a vicinity of the forward end 208 of the shank. The shell grasping portion may protrude substantially normal to an axis 305 of the shank. In a further embodiment, the clasp may additionally be attached to the shank by means of a suitable adhesive such as, but not limited to, one of the well-known epoxy resins.

FIG. 4 is a schematic diagram 400 showing an assembled live-crustacean holding fishing device of one embodiment of the present invention.

In the embodiment shown in FIG. 4, the tubular stretchable hook-casing 216 may enclose the fishing hook 205 and be attached by a first end to the clasp 213. The attachment may, for instance, be by friction or by means of a suitable adhesive such as, but not limited to, one of the well-known epoxy resins.

FIG. 5 is a schematic diagram 500 showing a live shrimp 106 attached to a live-crustacean holding fishing device 505 of a further embodiment of the present invention. As with the previous embodiment, the device relies to some extent on a ring tab enclosing a horn, or rostrum, 107 of the live shrimp. Moreover, the hook may be upward facing i.e., the point 209 of the hook may face upward, away from the tail 109 of the live shrimp when the device is attached to a live shrimp. This upward facing arrangement may allow for better casting, better tracking of the shrimp and better hooking of the prey.

Figure 6:
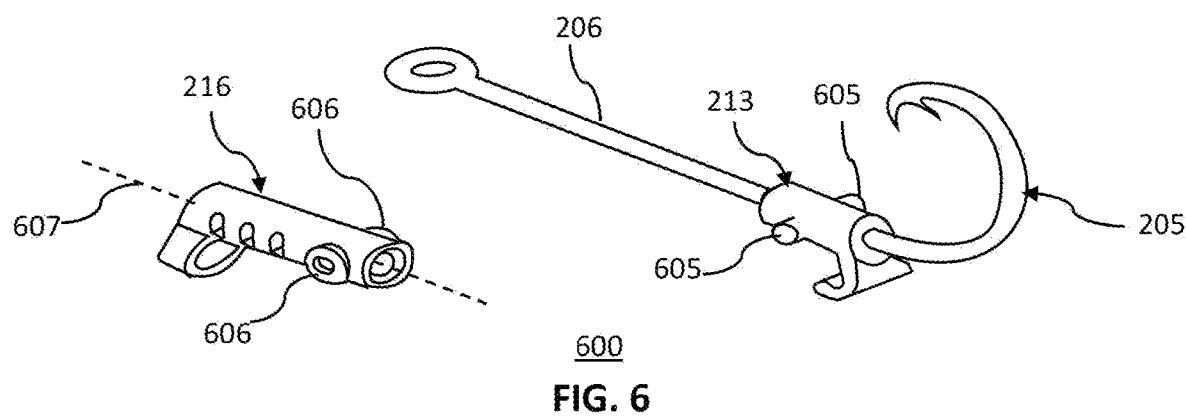
FIG. 6 is a schematic diagram showing representative component parts of a further embodiment of a live-crustacean holding fishing device of the present invention.

FIG. 6 is a schematic diagram 600 showing representative component parts of a further embodiment of a live-crustacean holding fishing device of the present invention.

In this embodiment, the clasp 213 may be molded around the shank 206 of the fishing hook 205 to form a first component. The molding process may leave the clasp free to slide along the hook's shank, or it may hold it in place at a particular location such as, but not limited to, a forward end of the shank. The clasp may additionally, or instead, be secured to the shank by means of a suitable adhesive such as, but not limited to, one of the well-known epoxy resins. The clasp 213 may also have one or more lateral protrusions 605 that may extend out substantially normal to an axis of the shank.

A second component may be a tubular stretchable hook-casing 216. In this embodiment, the hook-casing may have one or more openings 606 located laterally and extending normal to an axis 607 of the tubular stretchable hook-casing. The openings may be sized and shaped to fit the lateral protrusions 605 of the clasp. The number of openings preferably corresponds to the number of lateral protrusions of the clasp. In a preferred embodiment, this number is two so as to provide a symmetrical hold. The tubular stretchable hook-casing may, for instance, be molded from a suitable elastomer such as, but not limited to, a silicone rubber.

Figure 7:
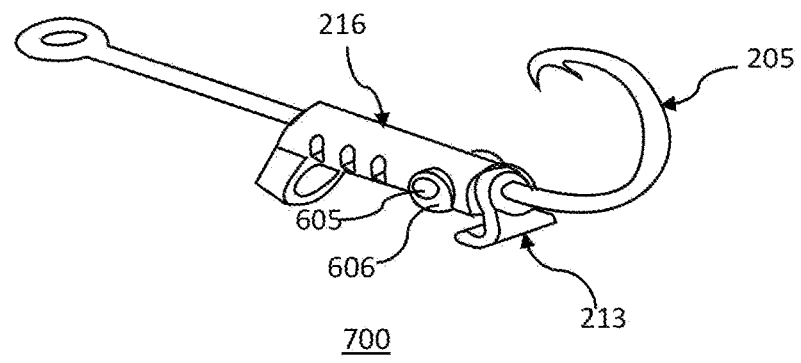
FIG. 7 is a schematic diagram showing an assembled live-crustacean holding fishing device of a further embodiment of the present invention.

FIG. 7 is a schematic diagram 700 showing an assembled live-crustacean holding fishing device of a further embodiment of the present invention. As shown, the tubular stretchable hook-casing 216 is held removably in place on the clasp 213 by means of the openings 606 engaging with, or encasing, the lateral protrusions 605.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A live-crustacean holding fishing device, comprising:
a fishing hook having a shank and comprising an arcuate bight at a forward end of said shank, said arcuate bight extending to a point and having at least one barb in a vicinity of said point, and having a line securing eye at an aft end of said shank;
a clasp, having a shell grasping portion, secured to said shank such that said shell grasping portion is proximate to said forward end of said;
a tubular stretchable hook-casing enclosing said shank and stretchable in a direction parallel to said shank, and attached to said clasp at a first end of said stretchable hook-casing; and, wherein the tubular stretchable hook-casing forms a continuous sleeve from said first end to a second end, said tubular stretchable hook-casing having a portion of said second end enlarged into a ring tab sized and shaped to accommodate a horn of a shrimp,
thereby, when stretched parallel to said shank and attached to said live-crustation, providing a tension parallel to said shank to securely fasten said live-crustation to said device while allowing said point of said hook to face upward away from a tail of said live-crustacean.

2. The fishing device of claim 1, wherein, said clasp further comprises a tubular groove and said clasp is secured to said shank by means of said tubular groove.

3. The fishing device of claim 2, wherein said clasp is further secured to said shank by means of an adhesive; and, said tubular stretchable hook-casing is attached to said clasp by means of an adhesive.

4. The fishing device of claim 3, wherein, said tubular stretchable hook-casing is comprised of an elastomer.

5. The fishing device of claim 1, wherein, said clasp further comprises one or more lateral protrusions; and, said tubular stretchable hook-casing has corresponding openings located laterally and extending normal to an axis of said tubular stretchable hook-casing, and wherein said tubular stretchable hook-casing is removably attached to said clasp by means of said lateral openings engaging with said lateral protrusions.

6. The fishing device of claim 5, wherein, said clasp is molded around said shank of said hook.

7. The fishing device of claim 6, wherein, said tubular stretchable hook- casing is comprised of an elastomer.

8. A method of producing a live-crustacean holding fishing device, comprising:
providing a fishing hook having a shank comprising an arcuate bight at a forward end of said shank, said arcuate bight extending to a point and having at least one barb in a vicinity of said point, and having a line securing eye at an aft end of said shank;
providing a clasp having a shell grasping portion;
securing said clasp to said shank such that said shell grasping portion is proximate to said forward end of said shank;
providing a tubular stretchable hook-casing enclosing said shank and stretchable in a direction parallel to said shank, and forming a continuous sleeve from a first and a second end, and having a portion of said second end enlarged into a ring tab sized and shaped to accommodate a horn of a shrimp; and
attaching said tubular stretchable hook-casing to said clasp by said first end, thereby, when stretched parallel to said shank and attached to said live-crustation, providing a tension parallel to said shank to securely fasten said live-crustation to said device while allowing said point of said hook to face upward away from a tail of said live-crustacean.

9. The method of claim 8, wherein, said clasp further comprises a tubular groove; and, securing said clasp to said shank by means of said tubular groove.

10. The method of claim 9, further comprising: securing said clasp to said shank by means of an adhesive; and, attaching said tubular stretchable hook-casing to said clasp by means of an adhesive.

11. The fishing device of claim 10, wherein, said tubular stretchable hook-casing is comprised of an elastomer.

12. The method of claim 8, wherein, said clasp further comprises at least one or more lateral protrusions; said tubular stretchable hook-casing comprises a corresponding number of openings located laterally and extending normal to an axis of said tubular stretchable hook-casing; and, removably attaching said tubular stretchable hook-casing to said clasp by engaging said openings with said lateral protrusions.

13. The method of claim 12, further comprising molding said clasp around said shank of said hook.

14. The method of claim 13, wherein said clasp is comprised of acrylonitrile butadiene styrene (ABS).

15. The fishing device of claim 12, wherein, said tubular stretchable hook-casing is comprised of an elastomer.

* * * * *